(12) United States Patent
De Gasquet et al.

(10) Patent No.: US 10,043,597 B2
(45) Date of Patent: Aug. 7, 2018

(54) STORAGE CONTAINER FOR IRRADIATED FUEL COMPRISING SHOCK-ABSORBING CASE GUIDE RAILS

(71) Applicant: TN International, Montigney le Bretonneux (FR)

(72) Inventors: Vincent De Gasquet, Guyancourt (FR); Vianney Chapuis, Suresnes (FR); Stéphane Nallet, Le Blanc Mesnil Saint Denis (FR); Louis Vilela, Nanterre (FR); Christophe Vallentin, Palaiseau (FR); Carine Hoffmann, Montigny le Bretonneux (FR)

(73) Assignee: TN INTERNATIONAL, Montigny le Bretonneux (FR)

( * ) Notice: Subject to any disclaimer, the term of this patent is extended or adjusted under 35 U.S.C. 154(b) by 0 days.

(21) Appl. No.: 14/891,451

(22) PCT Filed: May 20, 2014

(86) PCT No.: PCT/EP2014/060311
§ 371 (c)(1),
(2) Date: Nov. 16, 2015

(87) PCT Pub. No.: WO2014/187806
PCT Pub. Date: Nov. 27, 2014

(65) Prior Publication Data
US 2016/0125966 A1    May 5, 2016

(30) Foreign Application Priority Data

May 22, 2013    (FR) ..................... 13 54595

(51) Int. Cl.
*G21F 5/008*    (2006.01)
*G21F 5/08*    (2006.01)

(52) U.S. Cl.
CPC ............... *G21F 5/08* (2013.01); *G21F 5/008* (2013.01)

(58) Field of Classification Search
CPC ............... G21F 5/008; G21F 5/08; G21F 5/12
See application file for complete search history.

(56) References Cited

U.S. PATENT DOCUMENTS

| 4,800,283 A | 1/1989 | Efferding |
| 4,806,771 A * | 2/1989 | Mallory ................... G21F 5/08 |
| | | 188/377 |

(Continued)

OTHER PUBLICATIONS

Source URL (retrieved on May 27, 2016 14:52): http://rubberpartscatalog.com/home/products/vibration-control/sandwich-mounts-flex-bolt/Medium-sandwich-mounts/J-3424-Series.*

(Continued)

*Primary Examiner* — Eliza Osenbaugh-Stewar
(74) *Attorney, Agent, or Firm* — Pearne & Gordon LLP (57) ABSTRACT

A package (100) comprising storage packaging (1) as well as a confinement canister (3) for irradiated fuel, the packaging comprising a lateral body (2) which extends around a longitudinal axis (12) of the packaging and which includes an internal surface (22) which delimits a cavity for housing the canister (3), the packaging furthermore comprising at least one assembly (15) forming a guide rail for the canister in the cavity, mounted on the lateral body (2) and protruding at least partly into the housing cavity (4). According to the invention, the assembly forming a guide rail (15) includes an impact shock absorbing element (28) designed to absorb the shock, by plastic deformation, of a lateral impact between the packaging (1) and the confinement canister (3).

12 Claims, 6 Drawing Sheets

(56) References Cited

U.S. PATENT DOCUMENTS

| | | | | |
|---|---|---|---|---|
| 5,406,600 | A | * | 4/1995 | Jones .................. G21F 5/008 376/272 |
| 5,633,904 | A | * | 5/1997 | Gilligan, III .......... G21C 19/32 376/269 |
| 6,748,042 | B1 | * | 6/2004 | Stilwell, III ............. G21O 5/00 250/506.1 |
| 2003/0015541 | A1 | * | 1/2003 | Mingot ................ B65D 81/107 220/652 |
| 2005/0173432 | A1 | | 8/2005 | Chanzy |
| 2012/0126150 | A1 | * | 5/2012 | Tamaki .................. G21F 5/008 250/506.1 |

OTHER PUBLICATIONS

Search Report issued in French Patent Application FR 1354595 dated Jan. 30, 2014.
International Preliminary Report on Patentability issued in Application No. PCT/EP2014/060311 dated May 4, 2015.
International Search Report issued in Application No. PCT/EP2014/060311 dated Jul. 22, 2014.
Written Opinion issued in Application No. PCT/EP2014/060311 dated Jul. 22, 2014.
Translation of International Preliminary Report on Patentability issued in Application No. PCT/EP2014/060311 dated May 4, 2015.

* cited by examiner

STORAGE CONTAINER FOR IRRADIATED FUEL COMPRISING SHOCK-ABSORBING CASE GUIDE RAILS

TECHNICAL FIELD

This invention relates to the field of packages for the storage of irradiated fuel, comprising packaging as well as a canister which provides confinement of the irradiated fuel and which is housed in the cavity defined by the packaging.

THE STATE OF THE PRIOR ART

The packaging of an irradiated fuel storage package is generally intended to be placed vertically during storage. Nevertheless, prior to storage, loading of the confinement canister into the cavity of the packaging may be achieved with the latter placed horizontally.

In order to facilitate introduction of the canister, internally the packaging may be equipped with rails for guiding the canister, upon which this canister rests when it is slid into the cavity.

Once this operation has been carried out the housing cavity of the canister is closed off by a cover (or the removable end) of the packaging, then the package is tipped through 90° to adopt its vertical storage position.

In order to be able to meet regulatory storage requirements, the package must, notably, meet the requirements of the so-called "aircraft crash" test. This test may be simulated by a very high intensity impact taking place externally on the lateral body of the packaging. It is then necessary to demonstrate that the canister which provides confinement of the irradiated fuel remains sealed after this impact.

It has been shown that the presence of guide rails was a significant source of risk of breaching of the leak-tightness of the canister, especially when the impact is located on the part of the packaging which bears these rails. In order to resolve this problem, the packaging can be strengthened even further and/or it can be protected by additional shock absorbing means placed externally around the lateral body of said packaging.

Nevertheless, these measures may prove to be insufficient to meet the requirements of the aircraft crash test, and furthermore result in extremely high overall mass and volume which are not compatible with operational constraints.

It is noted that this problem in terms of the guide rails may also be encountered during an earthquake, during which repeated impacts may lead to damage being caused to the confinement canister, until this leads to a rupture in the leak tightness. Furthermore, this problem is not associated solely with guide rails for introducing the canister horizontally into the cavity of the packaging, but may also occur with any assembly forming guide rails provided for introducing the canister vertically into this same cavity.

PRESENTATION OF THE INVENTION

The purpose of the invention is therefore to at least partially provide a solution to the disadvantages mentioned above, compared with the embodiments of the prior art.

In order to do this the object of the invention is a package comprising packaging as well as a confinement canister for irradiated fuel, the packaging comprising a lateral body which extends around a longitudinal axis of the packaging and which bears an internal surface which delimits a housing cavity wherein the canister is placed, packaging furthermore comprising at least one assembly forming a guide rail for the canister in the cavity, the assembly being mounted on the lateral body and protruding at least partly into the housing cavity from said internal surface of the lateral body.

According to the invention, said assembly forming a guide rail includes an impact shock absorbing element designed to absorb, by plastic deformation, a lateral impact between the packaging and the confinement canister.

Thus, despite the protruding position of the assembly forming a guide rail in the cavity, the risk of damage to the confinement canister are limited by the shock absorbing element, which makes up all or part of the assembly forming the guide rail. In effect, following an external impact on the lateral body which causes it to be displaced and/or deformed, or, in the case of an earthquake, the forces transmitted to the canister are in part absorbed/filtered by the plastic crushing of the shock absorbing element between said canister and the lateral body. Thus the invention provides a particularly clever solution to the problems of meeting the requirements of the aircraft crash test, and to compliance with the regulatory criteria relating to the confinement of irradiated fuel.

In other terms, the impact shock absorbing element is designed to form a zone which preferentially undergoes plastic deformation in preference to the canister during the impact of the assembly forming the guide rail against said canister.

An assembly forming a guide rail is to be taken to mean any assembly protruding inside the cavity and which allows the canister to be guided during its introduction into the cavity, whether this introduction is carried out with the packaging placed vertically or horizontally. In this last case the assemblies concerned are those upon which the canister rests during the introduction, but also the assemblies which may simply be in contact with the canister during this operation. In the case of loading vertically, it means all the assemblies protruding into the cavity used to guide/centre the canister during the vertical introduction. It should all the same be noted that irrespective of the orientation of the packaging for loading, during storage in the vertical position there is not necessarily any contact between the canister and the assemblies forming the guide rails, with gaps in effect appearing/remaining. It is emphasised that the presence of said gaps amplify the force transmitted to the canister by the wall of the packaging and/or by the assembly forming the guide rail. Thus, the larger the aforementioned gap, the more consequential the force transmitted in the event of an external impact on the lateral body.

Preferably said assembly forming the guide rail extends along the direction of the longitudinal axis over a length corresponding to at least 70% of the height of the housing cavity along this same direction. Yet more preferentially, the length of this assembly is substantially equal to the height of aforementioned cavity.

Preferably, the assembly forming the guide rail is parallel to the longitudinal axis.

Preferably, the package comprises multiple assemblies forming guide rails spaced circumferentially apart from each other on the interior surface of the packaging body.

Preferably, the impact shock absorbing element is made of aluminium or of one of its alloys.

Preferably, the assembly forming the guide rail is arranged in part in a housing formed in the lateral body. Preferentially, in a plane of a transverse section of the assembly forming the guide rail, the ratio between the surface area of the part of this assembly located in the housing and the surface area of this housing is less than 0.9.

Alternatively, the assembly may be fixed so that it is entirely protruding from this body, without being partially housed in a housing or similar of the lateral body.

Preferably, the shock absorbing element is arranged so that it is free to move in translation along the longitudinal direction of the assembly forming the rail, in relation to the lateral body. Alternatively it may be fixed at one of its ends to the body, in order to be able to undergo thermal expansion relative to this body without stress. Nevertheless, as stated above, the shock absorbing element is preferably not fixed to the lateral body at all.

Preferably, the assembly forming the guide rail comprises a radially internal portion forming a rail, as well as the shock absorbing element arranged between the rail and the packaging lateral body. In particular the rail protects the shock absorbing element during the introduction of the canister, notably against the risk of tearing of material. In addition, by providing adequate rigidity, the rail can spread the forces over a larger surface area of the shock absorbing element with which it is in contact. The effectiveness of the shock absorbing function provided by the assembly is thus enhanced.

Preferably the rail is provided with a low-friction coating.

Preferably the rails and the impact shock absorbing element are connected to each other by a link made of complementary shaped parts. It may, for example, be a dovetail link, a square or rectangular section link or again a simple flat support face. Irrespective of the shape used for this link, it is preferably made such that a relative longitudinal movement can take place between the rail and the shock absorbing element, with an amplitude which may be limited, but which in particular allows for any differential thermal expansion between these two elements. This is naturally advantageous when the coefficients of thermal expansion are substantially different.

Finally, the rail is preferably firmly fixed to the lateral body at one of its ends and the same rail is arranged so that it is free to move in translation along the longitudinal direction of the rail, relative to the shock absorbing element, up to its other end. Preferably said end of the raid firmly fixed to the lateral body is located close to the opening of the cavity through which the canister is introduced.

As an indication, in a preferred embodiment the opening of the cavity concerned is located at the lower end of the packaging, the latter being equipped with a removable end designed to free the opening of the cavity.

This not only allows the problem of any differential expansion between these two elements to be managed, but also limits the risk of the rail buckling during the canister introduction phase. In effect, during this introduction the rail may deform freely along its longitudinal direction in the direction of said other end of the rail, relative to the shock absorbing element which supports it, without the risk of buckling.

Preferably the canister encloses irradiated fuel rods, preferably grouped together within one or more nuclear fuel assemblies.

Preferably, in any transverse section plane through the packaging and the canister, the ratio of the surface area of the canister delimited by its external surface and the surface of the cavity delimited by its internal surface is greater than 0.8.

Other advantages and characteristics of the invention will appear in the detailed non-restrictive description below.

BRIEF DESCRIPTION OF THE DRAWINGS

This description will be made in relation to the appended drawings, wherein.

DETAILED DESCRIPTION OF SPECIFIC EMBODIMENTS

Figure 1:
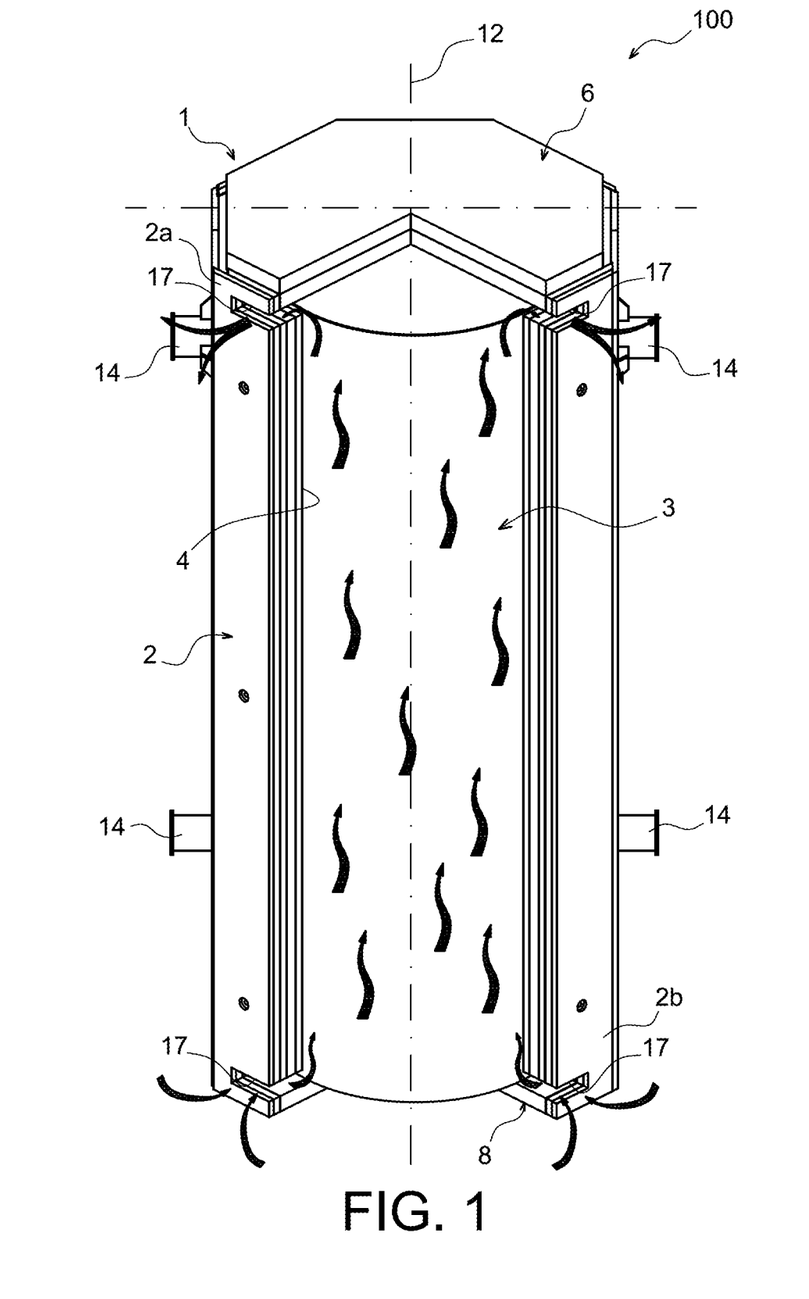
FIG. 1 shows a perspective view of a package according to a preferred embodiment of this invention, in the vertical storage position.
Figure 2:
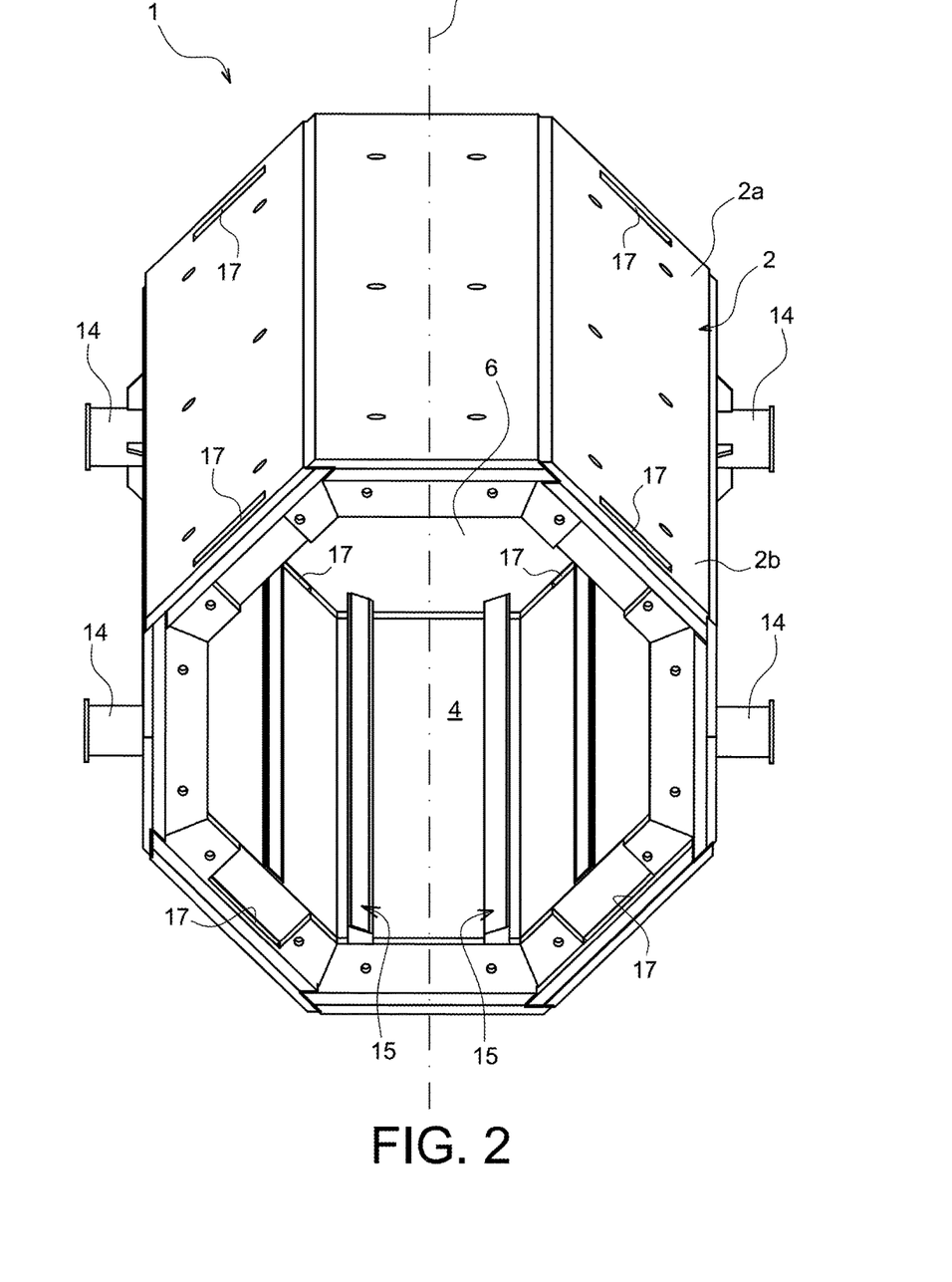
FIG. 2 shows a perspective view of the packaging of the package shown in the previous figure, in the horizontal position of loading of the canister.

With reference firstly to FIGS. 1 and 2, a package 100 for storage of radioactive materials taking the form of a preferred embodiment of the present invention is shown. The package is intended to hold irradiated fuel. It includes packaging 1 which receives a confinement canister 3 containing the nuclear fuel. Preferably this involves irradiated fuel rods, preferably grouped together within one or more nuclear fuel assemblies.

Packaging 1 includes overall a hollow lateral body 2 of cylindrical form and which defines a cavity 4 for receiving the canister 3, a detachable head cover 6 closing cavity 4 at one upper end 2a of body 2, together with a packaging base 8 closing cavity 4 at the other end of lateral body 2, called lower end 2b. The base may be made in one piece with the lateral body.

Figure 3:
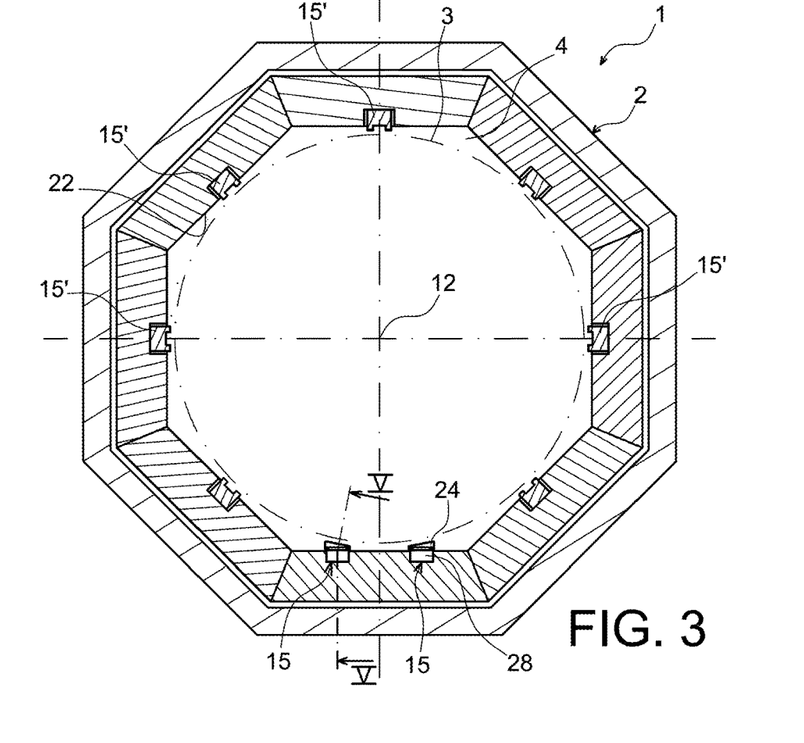
FIG. 3 shows a transverse section view of the packaging shown in the previous figure, with the cavity of the packaging receiving the canister.

In a manner known to those skilled in the art, the canister 3 fills a very large portion of the cavity 4. Usually this is expressed by the fact that in any transverse section plane through the packaging 1 and the canister 3, as in that of FIG. 3, the ratio of the surface area of the canister 3 delimited by its external surface and the surface area of the cavity 4 delimited by its internal surface 22 is greater than 0.8.

As is known to those skilled in the art, in such packaging for storage, preferably long-term storage, the cavity does not constitute a confinement enclosure for radioactive materials, this enclosure being effectively defined by the canister itself. Nevertheless, the design of this packaging provides the usual neutron protection, gamma radiation protection and mechanical strength functions. To achieve this, it may be envisaged in particular that the thickness of hollow lateral body 2 is at least 200 mm, and it can be made of steel.

The lateral body 2 extends around the longitudinal axis 12 of the packaging, on which the opening of the cavity located on the opposite side from the base 8 is centred.

The packaging 1 also comprises multiple handling devices 14, also called lifting trunnions, intended to fit onto a lifting beam (not represented) in order to enable the package to be moved/tipped. There are preferably four or more such devices, distributed near the upper and lower ends of lateral body 2, from which they project radially towards the outside.

In addition, packaging 1 comprises means of ventilation which allow air to circulate by convection between the cavity 4 and the outside of the packaging when the latter is in the vertical position. These specific means, providing an air flow which enables a portion of the heat released by the radioactive materials contained in the container to be collected and dissipated, can be produced by any means known to those skilled in the art. As an indication, through-passages 17 may be made at the upper and lower ends of the packaging, so that the exterior of the latter is linked to the cavity 4. These through-passages 17 may, for example, be made on the top 2a and bottom 2b ends of the body 2, as shown in FIGS. 1 and 2. Thus, as schematically shown by the arrows in those same figures, the external air passes through the packaging body 2 via the through-passages 17 of the bottom end 2b, then to enter within an annular free space between the canister 3 and the internal wall of the cavity 4, to then be extracted through analogous passages 17 provided at the top end of the body 2.

Figure 4:
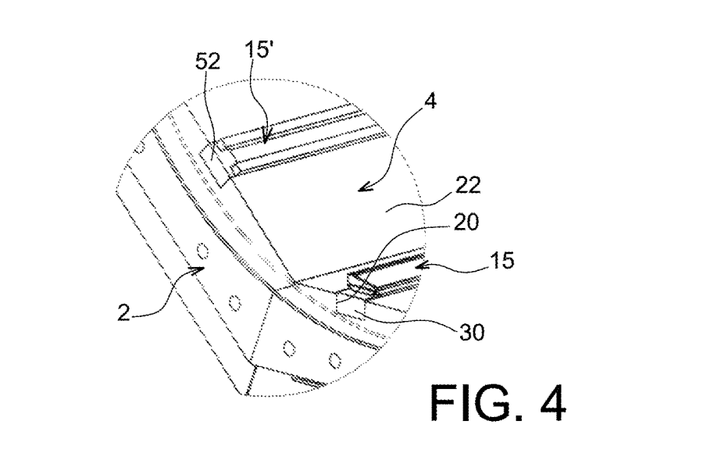
FIG. 4 shows a perspective view of a part of the packaging, showing one of the assemblies forming guide rails specific to this invention.

FIG. 4, in which the cover 6 has been removed for the purposes of clarity, shows that the interior surface 22 of the lateral body 2 which delimits the cavity 4 is equipped with means to help the canister slide relative to the lateral body 2 when it is being loaded into the cavity 4. As an indication, it should be noted that the introduction can alternatively be carried out from a removable base of the packaging, without going beyond the scope of the invention.

The means for helping the canister to slide are specific to this invention and will be described in detail whilst making reference to the following figures.

First of all with reference more specifically to FIGS. 3 to 6, it is shown that the packaging includes two assemblies 15 forming guide rails for the canister in order to introduce it into the cavity 4. These two assemblies 15 are spaced apart from each other circumferentially, for example by an angle of between 5 and 30° centred on the axis 12. These assemblies, with a long extended shape, extend parallel to said axis 12. Each of them is partly housed in a recess 20 in the lateral body, and protrude from this latter to the interior of the cavity 4, that is to say, they extend radially towards the interior beyond the surface 22 of the lateral body 2 which delimits the cavity 4. The recess 20 is a substantially parallelepiped-shaped housing extending parallel to the axis 12, over substantially the entire length of the cavity.

The two assemblies 15 concerned are those located lowest down when the packaging 1 rests horizontally, in the position for loading the canister 3. They are preferably arranged symmetrically in relation to a vertical median plane which includes the axis 12.

The preferred embodiment shown, each assembly 15 comprises a radially internal part 24 forming a rail, made of steel. A low-friction coating 26 may be applied, for example made of hard stainless steel. Naturally the purpose of this coating is to promote the sliding of the canister on the assemblies 15 when it is being introduced into the cavity, preferably carried out with the packaging horizontal as shown schematically in FIGS. 2 and 3.

Each assembly also includes a shock absorbing element 28, preferably made of aluminium or of one of its alloys. This element 28 is housed at least in part in the recess 20, being arranged between the lateral body 2 and the rail 24, as can be better seen in FIG. 5. This impact shock absorbing element 28 is designed to absorb, by plastic deformation, a lateral impact between the body 2 and the confinement canister 3. Thus although the assemblies 15 protrude into the cavity 4 in order to fulfil their first function of guiding the canister during its introduction into the packaging, the risks of damage to this confinement canister are limited by the impact shock absorbing element 28 which can undergo plastic deformation.

Figure 5:
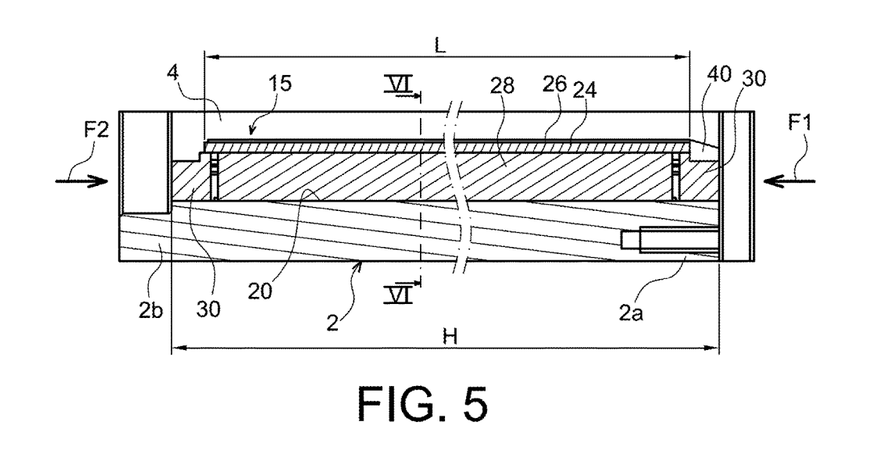
FIG. 5 is a section view along line V-V of FIG. 3.

The impact shock absorbing element 28 extends inside of the recess 20 in the form of a continuous bar over the entire length of the assembly 15. Alternatively, there may be several lengths of shock absorber arranged end to end along the longitudinal direction of the rail 24, which is preferentially continuous along its entire length, namely over the entire length of the assembly 15. In this regard, it should be noted that each assembly extends over a very large portion of the packaging. As can be seen in FIG. 5, each assembly 15 extends along the direction of the longitudinal axis 12 over a length "L" which corresponds to at least 70% of the height "H" of the cavity 4, with it being specified nevertheless that a percentage of up to 90% or more may be envisaged.

Each assembly 15 is assembled onto the lateral body 2 using two support spacers 30 each placed, respectively, at the ends of the recess 20. The spacers 30 are preferably welded to the lateral body 2, as the U-welds 34 show in FIGS. 6a and 6b. In addition the ends of the rail 24 and the spacers 30 are linked two by two by a connection using complementary shaped parts 46, here a dovetail connection.

As shown in FIG. 5, the shock absorbing element 28 is arranged with an axial gap between the head spacer 30 and the bottom spacer 30, so as to be able to expand freely in the longitudinal direction of the assembly 15 relative to the body 2 and to the rail 24. In other terms, the shock absorbing element 28 is simply wedged axially, with a gap, and maintained radially by being clasped between the base of the recess 20 and the rail 24.

Figure 6:
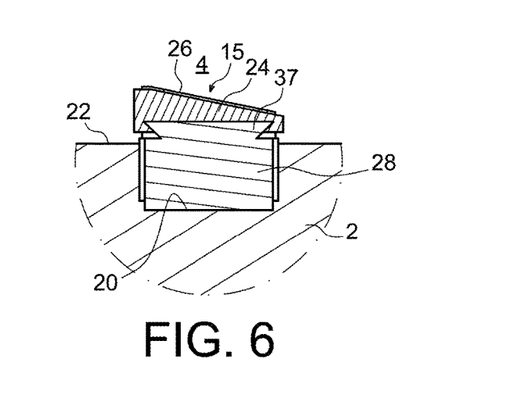
FIG. 6 is a section view along line VI-VI of FIG. 5.

With reference to FIG. 6, it is shown that the rail 24 and the impact shock absorbing element 28 are connected to each other by a connection using complementary shaped parts 37, here a dovetail connection. The connection 37 is located slightly more towards the interior that the limitation surface 22 of the cavity 4. Thus a very large portion of the shock absorbing element 28 is located in the recess 20, and more precisely, almost all of it, except for its internal end in the form of a dovetail, male or female. With this connection 37 relative longitudinal movement can occur between the rail 24 and the shock absorbing element 28, with an amplitude which is limited but which allows for the phenomenon of differential expansion between these two elements 24, 28.

Figure 6A:
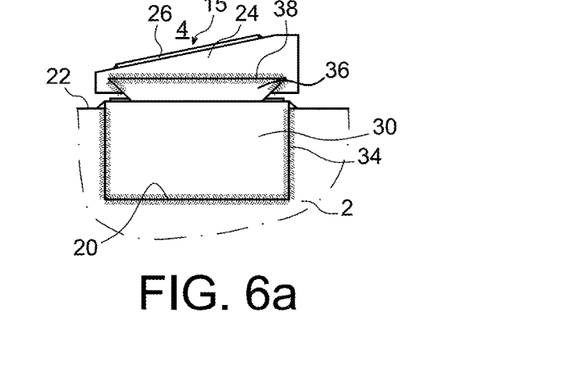
FIG. 6a is a view along the arrow F1 of FIG. 5, with the canister centring spacer removed.
Figure 6B:
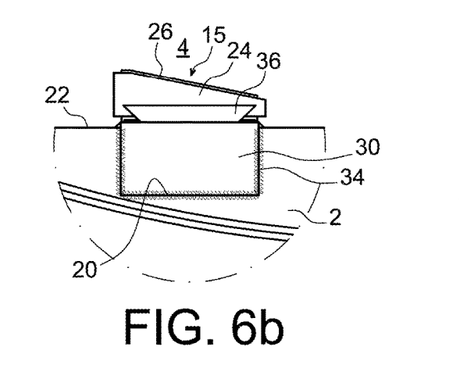
FIG. 6b is a view along arrow F2 of FIG. 5.

Returning to FIG. 6a, it should be noted that the rail 24 is firmly fixed to the support spacer 30 located at the side where the canister is introduced. In the embodiment that is described this is therefore the spacer located on the cover side. Fixing is achieved for example by a weld 38 along the dovetail interface. On the other hand, over the entire remaining length of the rail 24 from this end of the rail located close to the cover of the packaging, the rail is arranged so that it is free to move in translation along the longitudinal direction relative to the shock absorbing element 28. This is also the case with the other spacer 30, as can be seen in FIG. 6b which shows the connection 36 which offers a degree of freedom of translation between the rail 24 and said spacer 30.

Consequently the rail 24 is free to move in translation relative to the shock absorber 28 up to its other end, which in addition allows the problem of differential thermal expansion between these two elements to be managed, limiting the risk of buckling of the rail 24 during canister loading operations. In effect, during this introduction the rail can extend freely in the direction of the base, relative to the shock absorbing element 28 and to the spacer 30 located at the opposite end of the cavity intended for the introduction of the canister.

Figure 7:
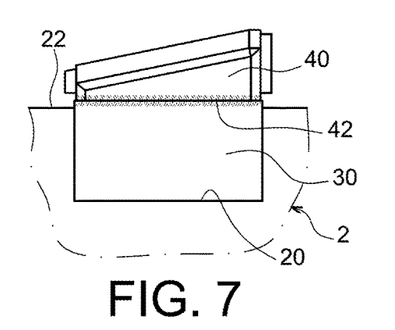
FIG. 7 is a similar view to that of FIG. 6a, with the canister centring spacer shown.

FIGS. 5 and 7 show that a centring spacer 40 is attached to the front of the head end of the rail 24, superimposed on the support spacer 30 to which it is preferably assembled by a weld 42 placed at the front interface between these two spacers 30, 40. Another weld is also envisaged at the interface between the head end of the rail 24 and this centring spacer 40 which, due to its inclined surface, allows the canister 3 to self-centre during the initial canister loading phase. The spacer 40 is preferentially wholly located within the cavity 4, that is, radially offset towards the interior relative to the surface 22.

Figure 8:
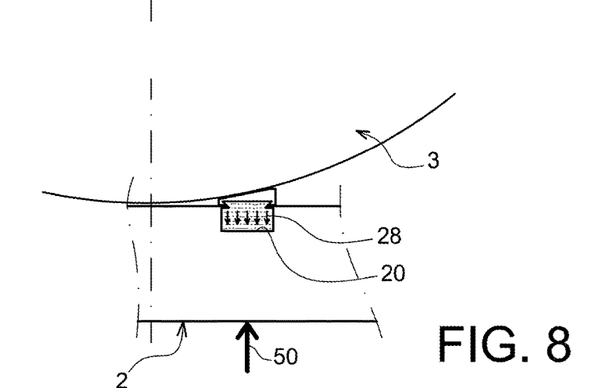
FIG. 8 shows a schematic view of the behaviour of the assembly forming the guide rail in the case of an impact occurring to the exterior of the lateral body of the packaging.

FIG. 8 shows a schematic view of the behaviour of the assembly 15 in the event of an impact taking place to the lateral body 2 of the packaging, simulating, for example, an aircraft crashing onto the package. Analogous behaviour may also occur in the event of an earthquake causing repeated high intensity shocks.

Following an external impact 50 on the lateral body 2 causing it to be displaced and/or deformed, the forces transmitted to the canister are in part absorbed/filtered by the plastic crushing of the shock absorbing element 28 between the canister 3 and the base of the recess 20 of the lateral body 2. In other terms, in the event of an external impact whose intensity is greater than a determined value, the shock absorbing element 28 forms a zone which preferentially undergoes plastic deformation, between the canister 3 and the body 2. In order to favour the crushing of the assembly 15 forming a guide rail, the latter is fitted in its housing 20 with a lateral gap. Such lateral gaps 31 are schematically represented in the transverse section in FIG. 8a. In effect they allow the portion 15a of the assembly 15 located in the housing 20 to be acceptably crushed without being hindered by the lateral walls of the housing. During a fall, the crushing of the part 15a, which is preferentially made up entirely of the shock absorbing element 28, leads to a lateral expansion of the assembly 15 and therefore to the lateral gaps 31 being taken up.

Figure 8A:
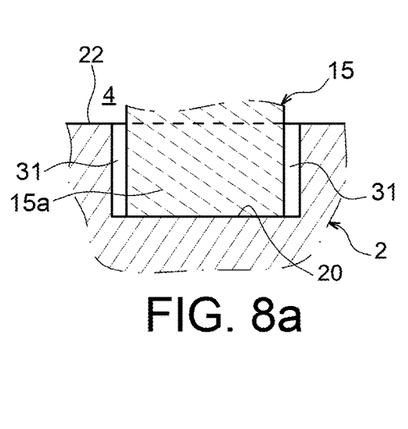
FIG. 8a shows schematically a lateral gap between the assembly forming a guide rail and the lateral wall of its housing.

As an indication, the sum of these gaps may be greater than 1 or 2 mm. Alternatively, a single gap may be provided instead of two without going beyond the scope of the invention.

Whatever the case, it is envisaged that in a plane of a transverse section of the assembly 15, as shown in FIG. 8a, the ratio between the surface area of the portion 15a located in the housing 20 and the surface area of this housing is less than 0.9.

This ratio is observed over at least 70% of the length of the assembly 15, but is obviously not achieved at the spacers 30 which entirely fill the housing 20.

Figure 9:
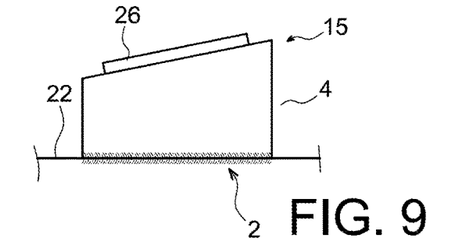
FIG. 9 is a similar view to that of FIG. 6a, with the assembly forming the guide rail being shown according to another envisaged embodiment.

With reference to FIG. 9, another possible embodiment of the assembly 15 is shown. Firstly the assembly is made in one piece. It thus forms in its entirety a shock absorbing element made to carry out the rail function although the low-friction coating 26 may be retained at its interior end. Furthermore, the assembly 15 protrudes entirely from the interior surface 22 which delimits the cavity 4, and is no longer partially inserted in a recess in the lateral body 2 of the packaging.

Figure 10:
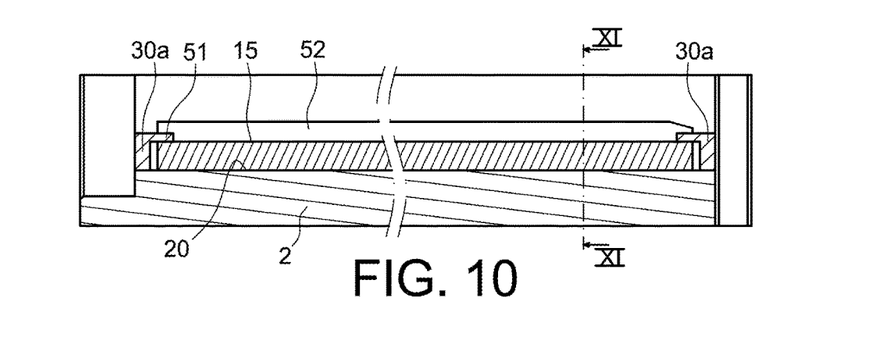
FIG. 10 is a similar view to that of FIG. 5, with the assembly forming the guide rail being shown according to another envisaged embodiment.
Figure 11:
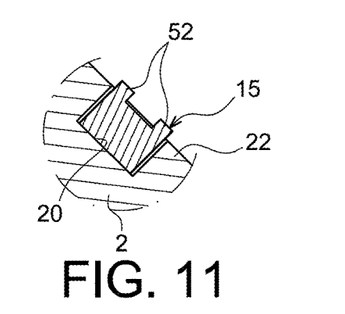
FIG. 11 is a section view along line XI-XI of FIG. 10.
Figure 12:
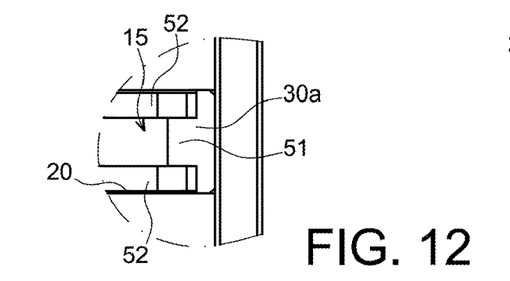
FIG. 12 is a top view of that of FIG. 10.

With reference now to FIGS. 10 to 12, another possible embodiment of the assemblies 15 forming the guide rails is shown. This preferably is a design used for assemblies other than the two bottom assemblies 15 shown in FIGS. 3 and 4 and described above. These other assemblies, arranged all around the cavity 4, have references 15' in said FIGS. 3 and 4. In what follows they will nevertheless be described under reference 15 for the description of FIGS. 10 to 12.

Each assembly 15 is also made from a single piece which in its entirety forms the shock absorbing element. It is free to move in translation relative to the body 2 along the longitudinal direction of the rail. It is also placed in a housing 20 of this body 2, being simply supported on the body at its ends by two fixing straps 30a. In order to this, the straps 30a are preferably welded to the body 2 and have a support foot 51 holding the assembly 15 against the base of the housing 20. For thermal expansion of the assembly 15, axial gaps are made between the latter and the straps 30a also arranged in the housing 20 of the packaging body 2.

The foot 51 of the fixing straps 30a is applied between two longitudinal external protruding parts 52 of the assembly 15, these protruding parts 52 each leading along the longitudinal direction of the rail.

Naturally various modifications may be made to the invention, which has just been described as non-restrictive examples only, by those skilled in the art.

What is claimed is:

1. Package (100) comprising storage packaging (1) as well as a confinement canister (3) for irradiated fuel, the storage packaging (1) comprising:
    a lateral body (2) which extends around a longitudinal axis (12) of the packaging and which includes an internal surface (22) which delimits a housing cavity (4) wherein the canister (3) is placed,
    a detachable head cover (6) closing the housing cavity (4) at an upper end (2a) of the lateral body (2),
    a packaging base (8) closing the housing cavity (4) at a lower end (2b) of the lateral body (2), and
    at least three assemblies (15) forming guide rails for the canister (3), each assembly (15) forming a guide rail for the canister in the cavity and being mounted on the lateral body and protruding at least partly into the housing cavity (4) from said internal surface (22) of the lateral body (2),
    wherein each of the at least three assemblies (15) includes an impact shock absorbing element designed to absorb the shock, by plastic deformation, of a lateral impact between the packaging (1) and the confinement canister (3),
    wherein in any transverse section plane through the packaging (1) and through the canister (3), the ratio of the surface area of the canister (3) delimited by its external surface to the surface area of the cavity (4) delimited by its internal surface (22) is greater than 0.8,
    wherein the at least three assemblies (15) are circumferentially spaced from each other and arranged around the cavity (4),
    wherein at least one assembly (15) of the at least three assemblies (15) comprises a radially internal portion forming a rail (24), and
    wherein the shock absorbing element of the at least one assembly (15) is arranged between the rail (24) and the lateral body (2), at least partially within a recess in the lateral body (2), the recess being defined by a bottom wall and two opposite lateral walls of a housing (20).

2. Package according to claim 1, wherein each of the at least three assemblies (15) extends along the direction of the longitudinal axis (12) over a length (L) corresponding to at least 70% of the height (H) of the housing cavity (4) along this same direction.

3. Package according to claim 1, wherein each of the at least three assemblies (15) is parallel to the longitudinal axis (12).

4. Package according to claim 1, wherein the at least three assemblies (15) are spaced circumferentially apart from each other on the interior surface (22) of the packaging body (2).

5. Package according to claim 1, wherein the impact shock absorbing element for each of the at least three assemblies (15) is made of aluminum or of one of its alloys.

6. Package according to claim 1, wherein in a transverse sectional plane of the at least one assembly (15), the ratio of the surface area of the portion (15a) of the at least one assembly (15) located in the housing (20) to the surface area of the housing (20) is less than 0.9.

7. Package according to claim 1, wherein the rail (24) of the at least one assembly (15) is provided with a low-friction coating (26).

8. Package according to claim 1, wherein the rail (24) of the at least one assembly (15) is made of steel.

9. Package according to claim 1, wherein the rail (24) and the impact shock absorbing element of the at least one assembly (15) are connected to each other by a connection which uses complementary shaped parts (36).

10. Package according to claim 1, wherein:
the rail (24) of the at least one assembly (15) is firmly attached to the lateral body (2) at one end, and
the rail (24) of the at least one assembly (15) is arranged so that a remaining length of the rail from the one end is free to move in translation along the longitudinal direction of the rail (24), relative to the shock absorbing element, up to the other end of the rail (24).

11. Package according to claim 1, wherein the canister (3) contains irradiated fuel rods, preferably grouped together within one or more nuclear fuel assemblies.

12. Package according to claim 1, wherein the guide rail of each of the at least three assemblies (15) is adapted to permit sliding of the canister (3) relative to the guide rail.

* * * * *